(12) United States Patent
Norman

(10) Patent No.: US 7,476,103 B1
(45) Date of Patent: Jan. 13, 2009

(54) SCIENCE PARTY KIT AND METHOD

(76) Inventor: Penelope Anne Norman, 4522 Santa Rita Rd., El Sobrante, CA (US) 94803

( * ) Notice: Subject to any disclaimer, the term of this patent is extended or adjusted under 35 U.S.C. 154(b) by 373 days.

(21) Appl. No.: 11/253,204

(22) Filed: Oct. 17, 2005

(51) Int. Cl.
G09B 23/00 (2006.01)

(52) U.S. Cl. ..................................... 434/276

(58) Field of Classification Search ................ 434/126, 434/276, 283, 300, 302; 446/176, 187, 211, 446/212
See application file for complete search history.

(56) References Cited

U.S. PATENT DOCUMENTS

| | | | | |
|---|---|---|---|---|
| 3,878,624 A | * | 4/1975 | DeFelice | 434/300 |
| 5,154,615 A | * | 10/1992 | Joubert | 434/301 |
| 5,242,307 A | * | 9/1993 | Reinbold | 434/298 |
| 5,692,945 A | * | 12/1997 | Crowell et al. | 446/183 |
| 5,720,618 A | * | 2/1998 | Scarpetti | 434/300 |
| 5,785,278 A | * | 7/1998 | Bejtlich, III | 244/139 |
| 5,871,361 A | * | 2/1999 | Gastle et al. | 434/295 |
| 6,106,302 A | * | 8/2000 | Schumacher | 434/295 |
| 6,561,810 B1 | * | 5/2003 | Schellhardt et al. | 434/126 |
| 6,568,170 B1 | * | 5/2003 | Rives | 60/221 |
| 6,957,526 B1 | * | 10/2005 | Lin | 60/221 |
| 6,969,260 B1 | * | 11/2005 | Lally | 434/302 |
| 7,021,987 B1 | * | 4/2006 | Lund et al. | 446/212 |

OTHER PUBLICATIONS

"NASAexplores 5-8 Lesson: Bottle Rocket", Jul. 8, 2003 [retrieved online Dec. 18, 2007].*
Kevin Karplus, "How to Make a Soda-Bottle Rocket Launcher", 1991 [retrieved online Dec. 18, 2007].*

* cited by examiner

Primary Examiner—Kurt Fernstrom
(74) Attorney, Agent, or Firm—Risto A. Rinne, Jr.

(57) ABSTRACT

An apparatus for amusing and edifying a plurality of children and of creating a party-atmosphere includes a plurality of components in a box for retail and an instruction manual that instructs at least one adult supervisor how to safely manage the plurality of children while each child uses the contents, and possibly other household items, to create an event, and wherein the event demonstrates a scientific principle or law. A method for creating a science party is also disclosed. Components are provided in the box along with complementary instructions for creating a safe environment for the plurality of children to experience the party.

12 Claims, 2 Drawing Sheets

SCIENCE PARTY KIT AND METHOD

BACKGROUND OF THE INVENTION

1. Field of the Invention

The present invention, in general, relates to amusements and, more particularly, to an apparatus and method for simultaneously amusing and edifying a group of children.

Whenever a group of children congregate there is often a need to amuse and occupy the children. Holidays, picnics, birthdays, special events are all occasions that may include the need to amuse groups of children. Piñatas are but one well known example of a method used to occupy a group of children during a party. As used herein, the terms "child" or "children" refer to those who still require adult supervision.

Whenever a plurality of children are gathered with the objective of enjoying themselves the term "party", as it is used herein, applies. For the purposes herein an ideal party size consists of up to six or seven children and, ideally, two responsible adults. If more than seven children are present, additional kits can be purchased and the assistance of additional adult supervisors can be obtained.

It is preferable to do more than merely entertain and amuse a group of children for a period of time. Ideally, a product and method that could be used to simultaneously edify the children as well amuse and entertain them is desired. That way, a lasting new benefit is provided that endures well beyond the short time span of the party.

Of course, there are many areas of life in which to instruct or teach. A specific area is that which appertains to any branch of science, for example, chemistry, physics, Newton's laws of motion, DNA, etc.

However, there can be danger inherent in an application of certain of the sciences. This has previously made it impossible to demonstrate certain scientific principles to a group of children and to do so while also creating a jovial, party-like setting and atmosphere. The demonstration of scientific principles presupposes a strict, rigid, and dogmatic approach that is generally regarded as anything but "fun". Virtually every student having gone through high school and beyond remembers a tightly controlled laboratory setting where each scientific principle is demonstrated by way of an "experiment".

Students have long been told that they are conducting an experiment, when in the truest sense it is merely a demonstration of a scientific principle or law that is being accomplished. A true experiment is employed to test a hypothesis. For an event to be a true experiment the outcome must, therefore, be an unknown. The experiment is designed and performed to either prove or to disprove the hypothesis.

This is the essence of the scientific method. Even so, demonstrations of scientific laws and principles are useful events to experience because they do further the aim of teaching. For the purposes herein, the terms "event" and "experiment" are used loosely and synonymously to mean a demonstration of a scientific principle or law in operation and are accomplished when the outcome is known and can be predicted.

Making a "party" safe is, of course, still a paramount consideration, including a scientific party. Furthermore, for children to be amused there typically must be some action that results or occurs, otherwise attention will soon be lost. To make science instruction a party-type of an experience an experiment or event must produce a tangible result that can be experienced. If there is action, color, sound, or other sensory stimulation or a combination of sensory stimuli that occurs, the greater will be the interest.

Keeping the result as active as possible and still safe for use in a group of children is not an easy goal to attain. Also, personally experiencing the result as it occurs after each child in the group has taken steps to ready the experiment provides a deep sense of satisfaction, making the child feel that he or she was more than a mere observer but was, in fact, a participant. Ideally, each child will feel as if he or she is a contributing scientist.

Compounding the difficulty of providing individual hands-on training and use for each of the party members is the fact that action items can include energies that are potentially dangerous if misused. Still, hands-on involvement is necessary otherwise certain of the group members might not be sufficiently amused and entertained.

Additionally, any kit must include the necessary items and instructions that provide both amusement and teaching.

Accordingly, there exists today a need for a party science kit and method.

Clearly, such an apparatus and method would be useful and desirable.

2. Description of Prior Art

Kits of various types are, in general, known. Kits that can educate an individual user or an individual kit-builder are known but they do not teach scientific principles or laws while also creating a party atmosphere. A "kit" that is for use by a group of children may amuse, as does a piñata, but such types of kits to not teach scientific principles or laws, and they do not include an experiment, or require individual hand-on preparation and participation for each of the group members. While the structural arrangements of the above described devices may, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a science party kit that can amuse a group of children.

It is also an important object of the invention to provide a science party kit that can entertain a group of children for a period of time.

Another object of the invention is to provide a science party kit that can amuse and simultaneously provide teaching of a scientific principle or law from a branch of science.

Still another object of the invention is to provide a science party kit that instructs and edifies each child and which also informs a supervisor how to create a safe environment during every phase of an experiment that the kit helps to create.

Still yet another object of the invention is to provide a science party kit that provides a safe environment to conduct an experiment.

Yet another important object of the invention is to provide a science party kit that allows each participant to personally participate in an experiment.

Still yet another important object of the invention is to provide a science party kit that allows each participant to personally participate with each experiment in the kit.

A first continuing object of the invention is to provide a science party kit that includes a plurality of certain essential components that are required for each experiment sufficient so that each member of a predetermined group size, as indicated by a message printed on the kit, is able to participate in the building and use of their own science-related project or apparatus.

A second continuing object of the invention is to provide a science party kit that allows each participant to build and personally participate in the creation of their own experiment, and which also includes an explanation of the scientific principle or law that is being demonstrated.

A third continuing object of the invention is to provide a science party kit that can entertain a group of children for at least an hour, and preferably for up to two hours.

A fourth continuing object of the invention is to provide a science party kit that includes the necessary items for each participant to build or ready a device, project, or experiment, absent certain items which are deemed to be common household-types of items.

A fifth continuing object of the invention is to provide a science party kit that does not include common household items that would be either difficult to include, hazardous, especially heavy, consumable, or otherwise undesirable to include in the kit.

A sixth continuing object of the invention is to provide a method for safely using the contents of a science party kit.

Briefly, a science party kit that is constructed in accordance with the principles of the present invention has an instruction manual, portions of which an adult can understand, and other portions of which a child can understand. The adult understands on a higher and more detailed level than the child, however, the child learns through pictures and text which the adult may read to the children, as desired. The manual explains a scientific law or principle and how it relates to a device, project, experiment, or event that each participant is building or readying something for use. The kit includes enough materials so that each participant is able to simultaneously build at least a portion of their own device, project, or experiment. Certain common household items are not included in the kit. A plurality of different devices, projects, or experiments may be included in the kit, as desired, to provide amusement for typically not less than one hour for the group. Ideally, as part of the method for using the kit, two adults are present and act as supervisors. A first adult supervisor provides guidance for a first child who is employing his device, project, experiment, or event while a second, remaining adult supervisor keeps the remaining children clustered together and away at a safe distance where they can watch the first child employ (use) his or her device, project, or experiment. The remaining second adult's primary responsibility is to maintain the remaining children a safe distance from the first adult. As desired, the second adult reports certain facts about the experience of the first child to the remaining children and, if desired, can assist the remaining children with the completion of their own work. The process is repeated for a second child, third child, etc. until each child has had his or her turn with the first adult. In this manner, all of the children create or enable something, safely employ or otherwise use it, and personally experience a result that is directly attributable to at least one scientific principle or scientific law. The connection between a theory about a scientific law or principle (i.e., what is stated) and an application of that theory (what is personally experienced) provides a powerful link between theory and practice that results in deep learning and practical application. The process provides amusement and entertainment, as well as valuable scientific instruction. A memorable party also becomes a profound and lasting learning experience for all of the participants.

DETAILED DESCRIPTION OF THE INVENTION

Figure 1:
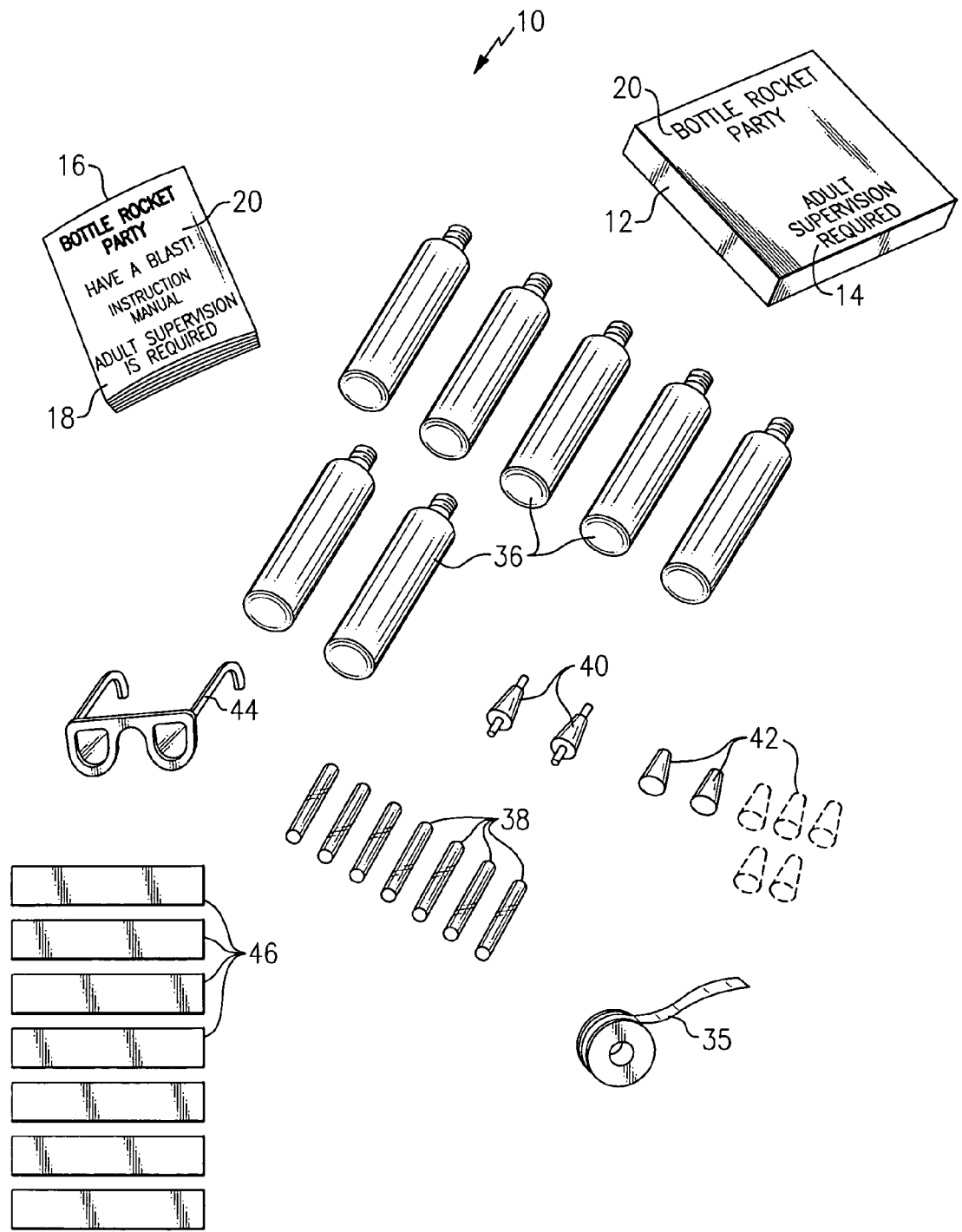
FIG. 1 is a view in perspective of a portion of the contents of a bottle rocket type of a science party kit that is used to amuse and to explore Newton's third law of motion.
Figure 2:
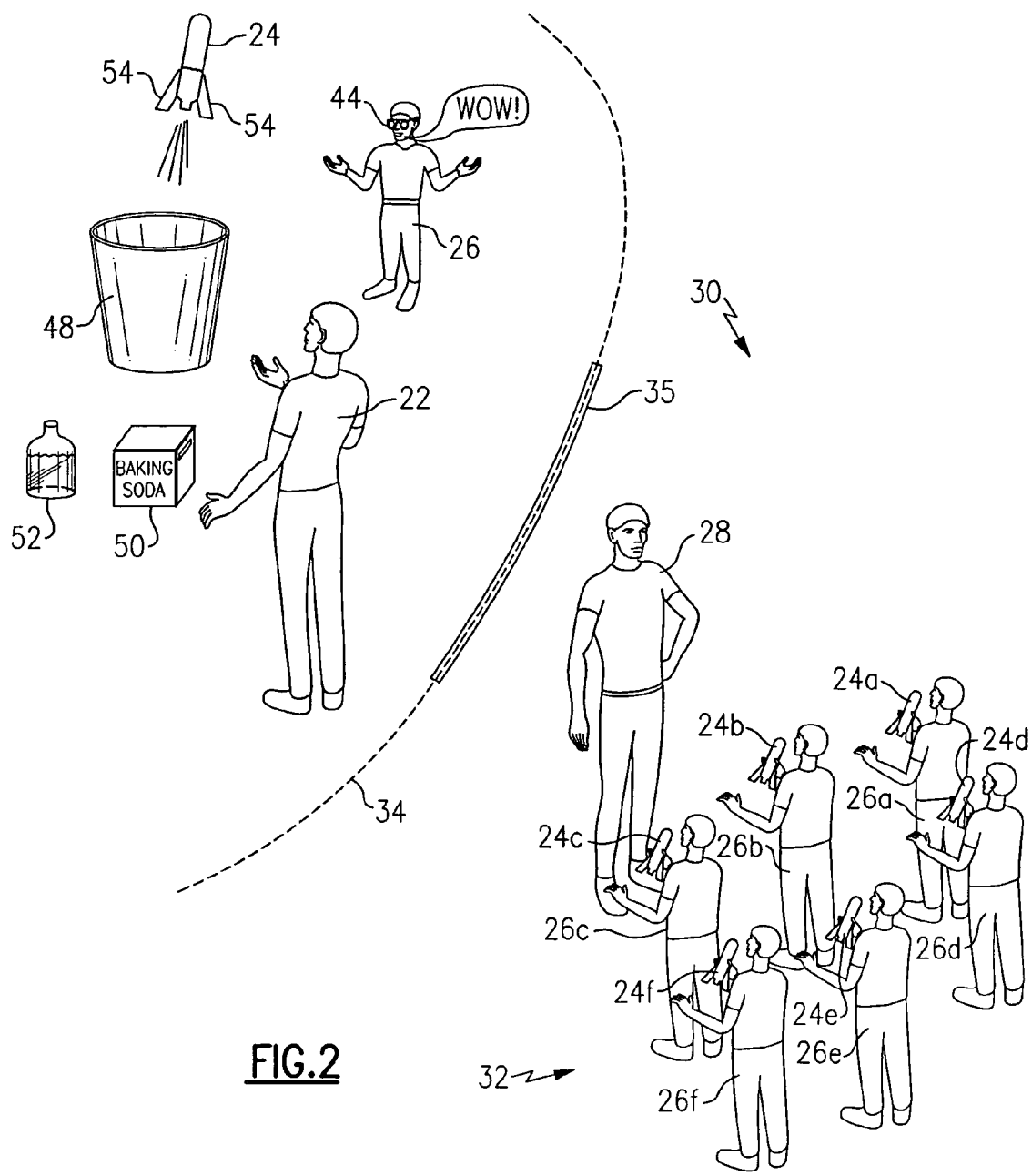
FIG. 2 is a view in perspective of an actual event occurrence, its facilitation being a result of a series of method steps detailing the use of the contents of FIG. 1 that have also been combined with certain other common household items that are listed in an instruction manual.

Referring on occasion to FIG. 1, and also to FIG. 2, and now primarily to FIG. 1 is shown, in exploded perspective, a portion of the contents of a bottle rocket type of a science party kit, identified in general by the reference numeral 10. Other, less critical, component parts that may be included in the science party kit 10 are not shown.

The bottle rocket version of the science party kit 10 explores Newton's third law of motion, "For every action there is an equal and opposite reaction." It is designed to teach, even impress, this law onto each of the group participants through a hands-on application of the principle (i.e., law) whereby each of the participants personally experiences in very real and practical terms what this law actually means.

By a careful blending of intensity of result with the principle (law) being studied, entertainment is a naturally occurring outcome. Children who participate in the use of the science party kit 10 have fun learning about Newton's third law of motion.

This provides a stark contrast from the mere blackboard memorization of the scientific law that many of us experienced as our primary learning model.

The bottle rocket type of science party kit 10 (hereinafter referred to as "the party kit 10") is but one example of the use of this methodology to teach and to amuse simultaneously. Other examples include chemistry, Newton's remaining laws of motion, DNA, or other scientific laws and principles, as desired.

The party kit 10 includes certain component parts that are necessary and which may be difficult to locate at home. If desired and practical, the party kit 10 may include all of the component parts necessary to achieve the desired result, or results. As desired, the party kit 10 will typically not include every required component for every experiment. Rather, certain relatively common and/or inexpensive but required household substances will not be included in the party kit 10. Instead, the adult supervisor will gather and provide them for use.

For example, the "bottle rocket" version of the party kit 10 requires copious amounts of water. A large quantity of water, readily available at home or wherever the party is to likely occur, is heavy and impractical to include in the party kit 10. Its inclusion would increase cost dramatically for a variety of reasons. Therefore, water is a logical substance to not include in the party kit 10.

However, for the party kit 10 to entertain a sufficient amount so as to be a practical focal point of a party, it will include enough materials and process steps to require at least a minimum of one hour for all of the participants to complete all of the experiments. An ideal time range is from one to two hours of total duration. It is difficult to maintain the attention span of certain children for more than about two hours maximum, regardless of how amusing the party kit 10 is designed to be.

Each party kit 10 will include enough component parts for an absolute minimum of 5 children to each perform each of the essential process steps. Preferably, the party kit 10 will include enough materials (component parts) for six or seven children. Seven children are generally considered to be a practical maximum to amuse and safely supervise simultaneously by the party kit 10.

For larger party gatherings, it is of course possible to purchase more than one of the party kits 10 (or different versions thereof) and, with ample additional adult supervision, entertain larger groups of children.

What is important to achieve with the party kit 10 is that a reasonably sized, reasonably priced, brightly decorated, and emotionally appealing (i.e., interesting) box 12 be on the retail shelves in stores for sale and easy use.

It is important to note that any version of the party kit 10 will either include or require the acquisition of either small parts, potentially toxic, potentially messy, potentially staining, or if improperly used, potentially dangerous substances including the release of various forms of energy. Therefore, every version of the party kit 10 will require adult supervision. The party kit 10 is not intended for purchase and use by children without accompanying adult supervision.

Accordingly, the box 12 must include a visible warning 14 that states that, "Adult supervision [is] required".

Every version of the party kit 10 also includes an instruction manual 16. The manual 16 also includes a second visible warning 18, either on the cover thereof or displayed prominently inside, that also states that, "Adult supervision [is] required".

Of course, both the box 12 and the manual 16 will also include a visible name 20 that identifies the specific version (i.e., type of contents, generally) of each of the party kits 10.

Upon opening the manual 16, a first page begins with a safety warning, a recommendation that two adults be present and that a first adult 22 manage each of a plurality of rocket 24 launchings, beginning with a first child 26, and that a remaining second adult 28 keep the other children clustered in an exciting and a safe observation zone, identified in general by the reference numeral 30, awaiting their turn and perhaps watching to see if they can determine what factors enable the rocket 24 to go higher and farther. A parts list of what is included in the party kit 10 and what is to be acquired at home is also included.

Different versions of the party kit 10 will, of course, modify these instructions (i.e., the contents of the instruction manual 16) somewhat to suit the specific type of science-related activity, experiment, or event.

However, a general set of principles that is included with all of the party kits 10 is to endorse the presence of two adults with specific instructions that one of them (the first adult 22) manages and control each "event", for example each launching having contact with only one child (i.e., the first child 26, first) at a time, and that the remaining adult (i.e., the second adult 28) ensures that the remaining children remain clustered together in a group, identified in general by the reference numeral 32, that is disposed within the safe observation zone 30.

The safe observation zone 30 is located not less than a predetermined distance away from the first adult 22. An area that is disposed beyond a safety radius 34 (shown by a dashed line) forms the safe observation zone 30. The safe observation zone 30 is either specified in the instruction manual 16 or it is left to the good prudence of the adults 22, 28 to determine, based on the particular location where the "party" is being had.

A length of brightly colored ribbon 35 is included in the party kit 10. To delineate the safety radius 34, the ribbon 35 is placed on the ground and the children are told that they cannot cross the ribbon 35 (the safety radius 34) unless an adult so instructs them to do so. The adults are advised (as stated in the instruction manual 16) to inform the children at the onset that any violation of this rule will stop the party from progressing further. If a violation occurs the party is stopped. It has been found that adherence to this strategy results both in compliance of this essential safety rule and that the well being of the participants (i.e., the children) is ensured.

The use of the ribbon 35 provides a substantial benefit in that it clearly indicates where the children must be disposed during each launch and where they cannot go unless instructed to by an adult.

A primary responsibility of the second adult 28 is to maintain each remaining child of the group 32 in the safe observation zone 30 behind the ribbon 35 while he or she awaits their own individualized turn with the first adult 22. The safe observation zone 30 is intended to keep the group 32 members safe while also maintaining them close enough to the first adult 22 so as to provide an exciting experience for each child in the group 32 when the first child launches the rocket 24.

The first adult 22 ensures that the first child 26 is also disposed in a safe location during each launching of the rocket 24, that safe location perhaps being closer to the actual event (i.e., the launching of the rocket 24) than the other members of the group 32 are disposed. This is desirable, if possible, in that a closer proximity to the event (i.e., the launching) adds an increased dimension of drama and excitement to the launching experience for the first child 26.

After the rocket 24 of the first child 26 has been launched and has landed, the first adult 22 (typically) fetches it and gives it to the first child 26 to complete the event experience. The first child 26 then enters the group 32. The second adult 28 permits one of the remaining children of the group 32, the next being a second child 26a, to take his or her rocket 24a and to go to the first adult 22. The first adult 22 then readies the rocket 24a in like manner and similarly assists with its launching.

The process is repeated for each remaining child 26b-f who, in turn, is assisted by the first adult 22 until each remaining child 26b-f has had his or her turn in launching their own rocket 24b-f and all remaining rockets 24b-f have been launched.

It is important to note that the party kit 10 includes enough rockets 24, 24a-f (seven, as shown) so that each participant has his or her own rocket 24, 24a-f to assemble, hold, and eventually launch.

An important method step, as described in any version of the instruction manual 16 of the party kit 10, includes hands-on assembly or participation by each member of the group 32 (each participant). Therefore, each participant (i.e., each child 26, 26a-f) must have their own essential component parts.

Therefore, typically six or seven of the essential component parts are included with the party kit 10 so that each child 26, 26a-f will be able to assemble and hold their own essential component parts. Assembly and holding onto their own rockets 24, 24a-f serves as an excitement-building prelude that reaches a pinnacle and culminates when each child 26, 26a-f personally participates, along with the first adult 22, in the actual event (i.e., launching) of their own rocket 24.

The term "event" is used herein to represent each launching experience of the bottle rocket version of the party kit 10. For other versions of the party kit 10 the "event" will, of course, be a different experience. It can be the result of a chemical reaction, for example, with a chemical version of the party kit 10. Other versions will have different event outcomes and experiences, but the general method steps described herein apply to each version of the party kit 10.

Accordingly, the party kit 10 provides a scientific party experience for the first child 26 and for each remaining child of the group 32. A science-party in the box 12 available for retail purchase is a new element (concept), not believed to be previously known.

To ensure accomplishment of the minimum one hour time requirement of each version of the party kit 10, two distinct types of launchings are taught in the instruction manual 16. There is, of course, no mandate that both types of launching occur. What is important is to provide potential and means for enough scientific "experimentation" in the party kit 10 to occupy the group 32 for a reasonable period of time.

The component parts in the box 12 that are shown include seven empty plastic bottles 36, seven small tubes 38, two rubber stoppers with inflation needles passing there-through 40, seven solid rubber stoppers 42 (five of which are shown in dashed lines to indicate that their inclusion could be optional), a pair of safety goggles 44 for only one child to use during a launch, and seven strips of paper 46. Other items can be added to the box, as desired. It is also possible to eliminate certain of the above items, for example the strips of paper 46 or each duplicate stopper 40, 42 can be eliminated, if desired. It is also possible to add components to the party kit 10.

Ideally, the paper 46 is waterproof or water-resistant and can be marked on (with a marker) but will resist deterioration when it becomes wet.

The bottles 36 are each like a conventional type of a plastic water bottle that holds about one-half liter of water and which are commonly available, however, the caps have been removed from each of the bottles 36 and are not used.

The exact steps to each launching are not especially critical to an understanding of the overall invention. The overall invention includes a providing of the science party kit 10 for retail purchase with instructions that disclose a method for its use that provides hand-on participation, anticipation and increasing excitement, culminating in an event (i.e., an experiment), and an application of a scientific principle to what occurs during the event with a new level of control and safety that does not detract from the event experience.

However, to ensure sufficiency of disclosure certain of the essential steps associated with the bottle rocket version of the party kit 10 are discussed hereinafter. For other versions of the party kit 10, different component parts, instructions, and steps will, of course, produce a different event outcome.

A first type of launching is based on compressed air and it includes about eight method steps.

A first step is to find (gather or obtain from the party kit 10) the 2 stoppers with the inflation needles 40.

A second step is to find a conventional type of a bicycle tire pump at home (not included in the box 12) and a bucket 48 (pail), also not included.

A third step is the fill the bucket 48 with water.

A fourth step is to provide each participant 26, 26a-f with their own empty plastic bottle 36 and to have each participant dip their own bottle 36 into the bucket 48 and fill the bottle 36 about one-half full of water. The paper 46 labels may already have been marked with the names of the participants and taped around the body of each bottle 36 to personalize the experience. This provides an unexpected benefit in that each participant also knows the names of each of the other participants, as is desirable and common at a party; however, it is accomplished without having to wear a label specifically for that purpose.

Therefore, both personal identification with their own rocket 24 (bottle 36) and a growing sense of camaraderie with the group 32 occurs simultaneously.

As mentioned before, one of the strips of paper 46 is preferably placed around a middle of the body of the bottle 36 and secured thereto, for example, with transparent tape or preferably waterproof tape that is also obtained at the house and is not necessarily included in the box 12. Each child would then use, preferably, a permanent type of a marker to write their own name on the strip of paper 46 or, if preferred, they could write their name directly onto the body of the bottle 36. In this manner they are "naming" the rocket (the bottle 36) after themselves and as a result of this additional optional step, they will each likely feel more involved in the actual process.

A fifth step is for the first adult 22 to then connect an end of a hose of the bicycle tire pump to one of the needle valves on one of the stoppers that includes the inflation needle 40.

A sixth step that can be performed by the first adult 22, or possibly by the first child 26 and each remaining child 26a-f is to push the stopper into the bottle.

A seventh step is for the first adult 22 to hold (in their hand between two fingers) the stopper (a portion of the stopper 40 that extends below a bottom of the bottle 36) and to use the stopper 40 to point the bottle 36 upward and at an angle that will ensure that it lands in an area free of the group 32, any other people, or objects to be avoided.

An eighth step is for the first child 26 to wear the goggles 44 and, after being advised to do so by the first adult 22 (when the first adult 22 has oriented the rocket 24 in a safe direction), the first child 26 is asked to pump the bicycle tire pump until the rocket eventually blasts off, which it will do when sufficient pressure develops inside of the bottle 36 to cause it to separate apart from the stopper 40.

The first adult 22 is also encouraged (in the manual 16) to obtain and to wear a second pair of goggles that were either obtained as a common household item or which may have been included as well in the party kit 10, as desired.

A ninth step is for the first adult 22 to explain to the first child 26 that, "For every action there is an equal and opposite reaction" and to then ask the first child 26, "What was the action and what was the reaction?".

If the child is unable to answer, the first adult 22 explains that the action is the water jetting-out of bottle 36 under pressure and the reaction is to cause the bottle to blast off (i.e., to be propelled) in an opposite direction as compared to the direction of movement of the water.

Only one of the stoppers with the inflation needles 40 is used. The other is a spare and could be eliminated from the box 12, if desired.

The instruction manual 16 now suggests that everyone take a break, go indoors and promise to do more at a later time. It is suggested that all participants enjoy a snack, cake, or ice cream, in general, to calm down from the excitement of the first series of launchings that they have just experienced and to continue to add to the party-feel of the occasion.

The instruction manual 16 then provides another cautionary warning that the first adult 22 only should control a quantity of baking soda 50 and vinegar 52 that will be used with the next (second) launching event.

Other cautions about emptying the bottle 36 of all water and of having the child stand back, away from the bottle 36 after having poured vinegar into it and having put baking soda into one of the tubes 38, are also stated.

The instruction manual 16 further warns that it is the first adult 22 who should combine the baking soda tube with the vinegar that is placed in the bottle 36.

A question is posed to all of the children 26, 26a-f, "Will a baking soda rocket go higher than did your air pressure rocket?" This inquiry induces speculation from each of the participants which further serves to increase their level of involvement, perhaps even their emotional investment, in the next or second event's outcome, the accomplishment of which includes the following general method steps:

A first step of the second event is to find the solid stoppers 42. Preferably, each child will have their own solid stopper 42 which may be made out of rubber, cork, etc. There is a possibility that the solid stopper 42 can be lost during the second launching event (because it is expelled from the bottle 36), so ideally each child will have their own.

A second step of the second event is to find the baking soda 50, vinegar 52, bucket 48, bottles 36, a funnel, and a spoon.

A third step, part "a" of the second event is for each participant to optionally decorate each rocket bottle 36, adding the paper strips 46 if they were not added before, making a paper nosecone (also optional) and taping it atop the bottle 36 at an end opposite that where the opening is disposed.

A third step, part "b" of the second event is optional and it is for each participant (preferably) to cut three to four tail fins 54 for each bottle 36. The tail fins 54 are used to stand the bottle in an inverted position with the nosecone pointing upward. If desired, cardboard or other material stock may be included in the party kit 10 for this purpose or it may be obtained from the household. If the tail fins 54 are not used, the first adult 22 must take greater care when he or she (in a later step) inverts the rocket 24 for launching to ensure that it remains in a desired attitude in the bucket 48.

A third step, part "c" of the second event is to optionally tape or glue the tail fins 54 to the sides of the bottle 36, as illustrated in the instruction manual 16, near an end of each bottle 36 that includes the opening.

A fourth step of the second event is for the adult (either the first adult 22 or the second adult 28, or both) to take the supplies outside and to adhere to the safety rules as previously stated. The first adult 22 then has the first child 26 come forward in front of the ribbon 35 and fill their bottle 36 about one-third full with vinegar 52, with the child actually selecting the quantity of vinegar 52.

A fifth step of the second event is to insert one of the tubes 38 over one of the solid rubber stoppers 42, as illustrated.

A sixth step of the second event is have the first child 26 scoop baking soda 50 out of its box and pour it into the tube 38, using the spoon as illustrated. A warning to not mix the baking soda with the vinegar as of yet is provided as well as a warning to now have the first child 26 stand back out of range in the safe location or possibly in the safe observation zone 30 with the group 32. The tube 38, preferably, has a slit cut along a portion of its longitudinal length (not shown) to facilitate the later mixing of the vinegar 52 with the baking soda 50.

A seventh step of the second event is for the first adult 22 to wear his own goggles, have the first child 26 wear the goggles 44, hold the bottle 36 horizontal, and to push the solid stopper 42 with the tube 38 containing the baking soda 50 into the bottle 36 (the slit being disposed upward).

A note indicating that the tighter the fit, the higher the rocket 24 will go is included in the instruction manual 16. An additional caution for the first adult 22 to not point either the rocket 24 (i.e., the bottle 36) or the solid stopper 42 at anyone, including at the first adult 22 is also provided as part of this step.

An eighth step of the second event is for the first adult to quickly stand the rocket 24 with the solid stopper 42 and tube 38 and baking soda 50 on the bottom, inside of the bucket 48, with the nosecone pointing upward as illustrated. If the tail fins 54 have been added, the rocket 24 is placed on the tail fins 54. If the tail fins 54 have not been added, the rocket 24 is placed against a side of the bucket 48 which is held at a slight angle.

A ninth step of the second event is for the first adult 22 to stand back and wait.

A tenth step of the second event is to observe the launching of the rocket 24.

The children are again reminded of Newton's third law of motion and are again asked, "What was the action and what was the reaction?" To the detail that is deemed to be appropriate and desired, they are told that a resultant chemical reaction produces large amounts of carbon dioxide that was trapped inside the bottle 38 by the solid stopper 42. The increasing quantity of carbon dioxide increased the pressure inside the bottle 36 until the pressure became sufficient to eject the solid stopper 42 and (likely) the tube 38 from the bottle 36. The stopper 42 and tube 38 are usually trapped and contained by the bucket 48 and are available for reuse, if desired. The escaping vinegar 52 and carbon dioxide provide the action and the movement of the rocket 24 is again the reaction.

The bucket 48 also traps the vinegar 52 and the baking soda 50 as the rocket 24 is launched. This keeps the environment in which the party takes place neater and reduces cleanup time and effort.

The seven children 2, 26a-f will each, in turn, launch their "chemical-fueled" rocket 24. From one to two hours will have elapsed, typically from opening the box 12 until the last chemical-fueled rocket 24 has been launched. The science party is now complete, other than for minimum cleanup and a lifetime of happy recollections of the "science party" and a clear understanding of Newton's third law of motion, which has been well-learned by every participant who has personally experienced it two times and observed it up to fourteen times per party kit 10.

With certain of the events, for example with a DNA version of the party kit 10, a plasmid that is formed can be created simultaneously by all of the participants, as opposed to the required individual launchings of the bottle rocket version of the party kit 10. An assessment is made regarding the risk and safety issues as well as the potential for creating a mess or of causing damage to surrounding structures. If the risk for safety, mess, or damage to surrounding structures is deemed to be sufficiently low, the instruction manual 16 can include specific instructions that enable any given event (i.e., experiment) to occur simultaneously for all of the children 26, 26a-f.

Of course, the instruction manual is subject to change as are the contents (i.e., the components that are included in the box 12), as are any of the "experiments" that are performed.

It is the personalized fabrication done together in a group 32, the readying of each experiment that creates both a corresponding event and also which greatly contributes toward creating an enjoyable and memorable party atmosphere. Creating a party-like experience for the participants while each participant personally prepares and then participates alone (one at a time) in performing a scientific experiment not only amuses the participants, both individually and as the group 32, but it also provides a new and superior teaching methodology.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A science party kit for the amusement and edification of a plurality of children, comprising:

(a) a plurality of component parts sufficient to enable said plurality of children to possess their own portion of the component parts sufficient to permit each of said plurality of children to create an assembly, and wherein said assembly is structurally identical for each of said plurality of children, and wherein said assembly is used by each of said plurality of children to produce an event, said event demonstrating a scientific principle or law;

(b) instructions that inform an adult supervisor how to safely manage said plurality of children, and wherein said instructions also provide information as to how each of said plurality of children is to use their assembly to produce said event;

wherein said instructions include an explanation of said scientific principle or law for said plurality of children; and wherein said instructions include an instruction manual and wherein said instruction manual includes a requirement for two adult supervisors, and wherein a first adult supervisor of said two adult supervisors is instructed to provide coaching and support to a first of said plurality of children at a first location for a period of time sufficient to use said assembly of said first of said plurality of children to accomplish said event, and wherein a remainder of said plurality of children are disposed at a second location during the course of time said first of said plurality of children is disposed at said first location, and wherein said second location is disposed further away from said event than is said first location, and wherein after said event is accomplished for said first of said plurality of children said first of said plurality of children is required to leave said first location and to enter said second location, and wherein a second of said plurality of children is required to leave said second location and to enter said first location and wherein said first adult supervisor is instructed to provide coaching and support to said second of said plurality of children at said first location for a period of time sufficient to use said assembly of said second of said plurality of children to accomplish a repetition of said event, and wherein the above protocol is repeated until each of said plurality of children have been at said first location with said first adult supervisor and wherein each of said plurality of children have used their assembly to experience a repetition of said event at said first location; and wherein a second adult supervisor of said two adult supervisors is disposed at said second location and maintains that said remainder of said plurality of children that are not disposed at said first location remain at said second location until it is the turn of another one of said plurality of children to experience said event at said first location;

and wherein the demonstration of said scientific principle or law by said event or by a repetition of said event is repeated for each of said plurality of children at said first location while said remainder of said plurality of children are at said second location, and wherein said event includes a potential for a teaching of said scientific principle or law to each of said plurality of children and also wherein said event includes an element of danger or a potential for injury to occur to any of said plurality of children, and wherein said first adult supervisor promotes a sense of individual involvement for each of said plurality of children at said first location by using said assembly of each of said plurality of children and wherein said first adult supervisor ensures the safety of each of said plurality of children during the time that each of said plurality of children is disposed at said first location, and wherein said second adult supervisor ensures the safety of said remainder of said plurality of children at said second location; whereby said demonstration of said scientific principle or law is safely repeated as many times as is equal to the total number of children in said plurality of children;

and wherein said scientific principle or law includes Newton's third law of motion and wherein said component parts are sufficient to provide for a bottle rocket party;

and wherein said component parts include at least five empty plastic bottles, said instruction manual, a pair of goggles, a solid stopper, a modified stopper that includes a center longitudinal opening there-through that is adapted to permit an inflation needle to pass through said opening in said modified stopper, and at least five tubes that are adapted to fit over a portion of an end of said solid stopper and inside one of said empty plastic bottles.

2. The science party kit of claim 1 wherein said instruction manual includes a requirement to provide a safe observation zone and to place said remainder of said plurality of children in said safe observation zone during said event, and wherein said safe observation zone includes said second location.

3. The science party kit of claim 1 wherein said plurality of children includes not less than five and not more than seven children.

4. The science party kit of claim 3 wherein if not less than five children are present, a minimum of one hour of time will be required for preparation and to accomplish all of said events, as specified in said instructions.

5. The science party kit of claim 4 wherein a maximum of two hours of time will be required for preparation and to accomplish all of said events, as specified in said instructions.

6. A method for creating a science party to amuse and edify a plurality of children, comprising the steps of:

(a) providing a science party kit that includes a plurality of component parts sufficient to enable said plurality of children to possess their own portion of the component parts sufficient to permit each of said plurality of children to create an assembly, and wherein said assembly is structurally identical for each of said plurality of children, and wherein said assembly is used by each of said plurality of children to produce an event, said event demonstrating a scientific principle or law; and (b) including instructions that inform an adult supervisor how to safely manage said plurality of children, and wherein said instructions also provide information as to how each of said plurality of children is to use their assembly to produce said event; wherein said instructions include an explanation of said scientific principle or law for said plurality of children; and wherein said instructions include an instruction manual and wherein said instruction manual includes a requirement for two adult supervisors, and wherein a first adult supervisor of said two adult supervisors is instructed to provide coaching and support to a first of said plurality of children at a first location for a period of time sufficient to use said assembly of said first of said plurality of children to accomplish said event, and wherein a remainder of said plurality of children are disposed at a second location during the course of time said first of said plurality of children is disposed at said first location, and wherein said second location is disposed further away from said event than is said first location;

and wherein after said event is accomplished for said first of said plurality of children requiring said first of said plurality of children to leave said first location and to enter said second location, and requiring a second of said plurality of children to leave said second location and to enter said first location, and wherein said first adult supervisor is instructed to provide coaching and support to said second of said plurality of children at said first location for a period of time;

using said assembly of said second of said plurality of children to accomplish a repetition of said event, and repeating the above protocol until each of said plurality of children have been at said first location with said first adult supervisor and wherein each of said plurality of children have used their assembly to experience a repetition of said event at said first location; and disposing a second adult supervisor of said two adult supervisors at said second location, and having said second adult supervisor maintain a remainder of said plurality of children that are not disposed at said first location at said second location until it is the turn of another one of said plurality of children to experience said event at said first location; and demonstrating said scientific principle or law by said event or by a repetition of said event for each of said plurality of children at said first location while said remainder of said plurality of children are at said second location, and wherein said event includes a potential for a teaching of said scientific principle or law to each of said plurality of children and also includes an element of danger or a potential for injury to occur to any of said plurality of children, and wherein said first adult supervisor promotes a sense of individual involvement for each of said plurality of children at said first location by using said assembly of each of said plurality of children and by ensuring the safety of each of said plurality of children during the time that each of said plurality of children is disposed at said first location, and wherein said second adult supervisor ensures the safety of said remainder of said plurality of children at said second location; whereby said demonstration of said scientific principle or law is safely repeated as many times as is equal to the total number of children in said plurality of children.

7. The method of claim 6 wherein said scientific principle or law includes Newton's third law of motion and wherein said component parts are sufficient to provide for a bottle rocket party and wherein said instructions provide for a first event, and wherein said instructions include the steps of:
   (a) locating a stopper with an inflation needle passing therethrough;
   (b) locating a conventional type of a bicycle tire pump and a bucket;
   (c) filling said bucket with water;
   (d) providing each of said plurality of children with an empty plastic bottle and instructing each of said plurality of children to dip said bottle into said bucket and filling said bottle approximately one-half full of water;
   (e) connecting an end of a hose of said bicycle tire pump to said needle;
   (f) pushing said stopper into said bottle;
   (g) holding said stopper and using said stopper to point said bottle upward; and
   (h) pumping said bicycle tire pump an amount sufficient to cause said pressure to increase in said bottle an amount sufficient to jettison said stopper from said bottle and to propel said bottle.

8. The method of claim 6 wherein said scientific principle or law includes Newton's third law of motion and wherein said component parts are sufficient to provide for a bottle rocket party and wherein said instructions provide for a second event, and wherein said instructions include the steps of:
   (a) locating a solid stopper;
   (b) locating a quantity of baking soda, vinegar, a bucket, a plurality of bottles, a funnel, and a spoon;
   (c) providing each participant with one of said plurality of bottles and filling each of said plurality of bottles about one-third full of said vinegar;
   (d) placing a tube over said stopper;
   (e) filling said tube with a quantity of said baking soda; and
   (f) holding said bottle in a horizontal attitude while attaching said tube and said stopper to said bottle; and
   (g) placing said bottle in an upright attitude.

9. The method of claim 6 wherein said scientific principle or law includes Newton's third law of motion and wherein said component parts are sufficient to provide for a bottle rocket party and wherein said instructions provide for a second event, and wherein said instructions include the steps of:
   (a) locating a solid stopper;
   (b) locating a quantity of baking soda, vinegar, a bucket, a plurality of bottles, a funnel, and a spoon;
   (c) decorating each of said plurality of bottles;
   (d) attaching a minimum of three tail fins to each of said plurality of bottles;
   (e) filling each of said plurality of bottles about one-third full of said vinegar;
   (f) placing a tube over said stopper;
   (g) filling said tube with a quantity of said baking soda; and
   (h) holding said bottle in a horizontal attitude while attaching said tube and said stopper to said bottle; and
   (i) placing said bottle upright on said tail fins in said bucket.

10. An improvement to a method for creating a party to amuse and edify a plurality of children, wherein the improvement comprises:
    (a) providing a kit for retail sale, said kit including essential components for creating a demonstration of a scientific principle;
    (b) including a length of a flexible material in said kit along with instructions for placing said flexible material on the ground to create a demarcation line, a first side of said demarcation line being disposed proximate an experiment that said kit promotes and an opposite second side of said demarcation line being disposed further away from said experiment than said first side, and permitting only one member of said plurality of children at a time to be disposed on said first side of said demarcation line, and of repeating said experiment a number of times equal to the total number of children in said plurality of children with a different one of said plurality of children being disposed on said first side of said demarcation line each time said experiment is repeated; and
    (c) requiring a first adult supervisor to be disposed on said first side and a second adult supervisor to be disposed on said second side for the entire duration of said experiment.

11. The improvement of the method of claim 10, further comprising:
    forming a group that includes said plurality of children except for said only one member of said plurality of children, and of requiring said group to be disposed on said second side of said demarcation line during an accomplishment of said experiment.

12. The improvement of the method of claim 10 further comprising the including of a ribbon in said science party kit as said flexible material.

* * * * *